H. S. HOPPER.
VEHICLE DRIVE GEAR.
APPLICATION FILED AUG. 11, 1915.
1,191,699.
Patented July 18, 1916.
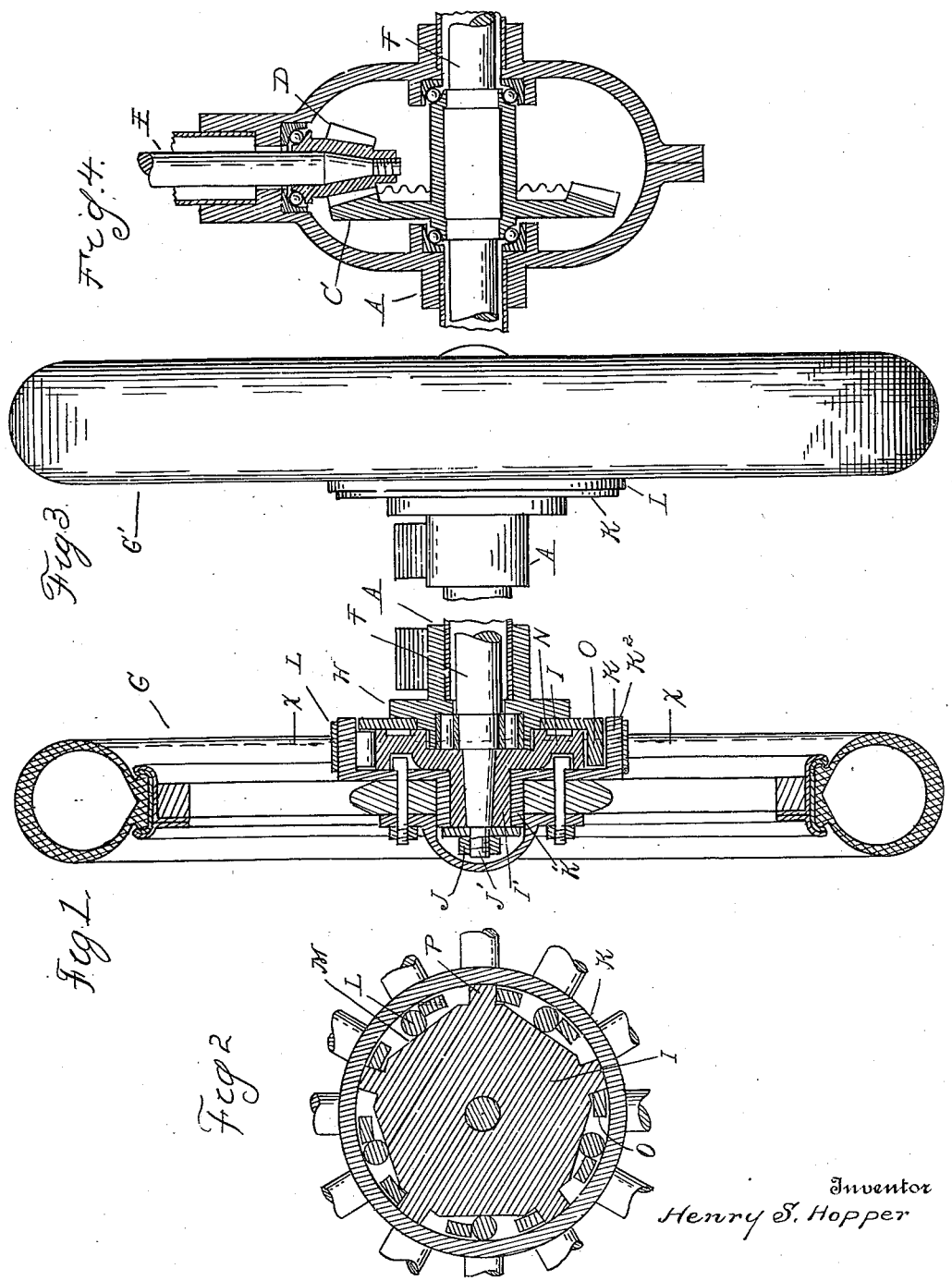
Inventor
Henry S. Hopper
By Whittemore Hulbert & Whittemore
Attorney

UNITED STATES PATENT OFFICE.

HENRY S. HOPPER, OF DETROIT, MICHIGAN.

VEHICLE DRIVE-GEAR.

1,191,699.  Specification of Letters Patent.  Patented July 18, 1916.

Application filed August 11, 1915. Serial No. 44,926.

*To all whom it may concern:*

Be it known that I, HENRY S. HOPPER, a citizen of the United States of America, residing at Detroit, in the county of Wayne and State of Michigan, have invented certain new and useful Improvements in Vehicle Drive-Gears, of which the following is a specification, reference being had therein to the accompanying drawings.

The invention relates to driving mechanism for vehicles of the type providing for the differential movement of the driving wheels from the same axle to permit of turning curves.

It is the object of the invention to provide a construction in which the driving of each wheel is entirely independent of the movement of the other wheel, and which is also capable of reversal in the direction of drive.

In the drawings: Figure 1 is a horizontal section through a portion of a vehicle drive axle to which my improvements are applied; Fig. 2 is a section on line $x$—$x$ Fig. 1; Fig. 3 is an elevation of the opposite end of the axle from that shown in Fig. 1; and Fig. 4 is a section through the central portion of the axle.

A is the axle housing; B is the central enlargement thereof for the bevel gears C D, through which motion is transmitted from the propeller shaft E to the live axle F. In place of making the axle F in two sections connected by a differential gearing, which is the usual practice, I extend a single axle to each of the drive wheels G and G'. At its opposite ends the axle is journaled preferably in roller bearings H, and beyond these bearings is non-rotatively coupled with a member I, which forms an element of a friction clutch. This member has a hub portion I', which preferably engages a tapered end portion of the shaft F, being clamped by a nut J engaging a threaded end stud J'.

K is the coöperating member of the clutch, which surrounds the member I, having a sleeve portion K' rotatively engaging the hub portion I'; also the annular flange K², the external surface of which forms a brake drum. The members I and K are coupled to each other, preferably by rolls L, and as shown the peripheral face of the member I is provided with cam portions M for wedging the rolls to effect the lock. Thus when the member I is driven the rolls L will wedge, locking the member K thereto and imparting the rotation to the wheel. On the other hand, where the wheel travels in advance of the axle the rolls L will be released from their wedging engagement and will permit the independent rotation of said wheel.

If the axle were always to rotate in one direction the construction as thus far described would be operative, but as it is necessary to reverse the drive the cams M must be double acting, so that they will wedge the rolls in whichever direction the axle is driven. This would defeat the releasing of the wheel when driven ahead, for it is obvious that such a movement would cause a reëngagement of the rolls with the opposite side of the cam and again lock the wheel to the axle. I have therefore provided means by which the clutch is permitted to engage only when driven from the axle, whichever direction the latter is rotated, and is released from engagement and prevented from reëngagement when driven by the wheel.

As shown, N is a member rotatively mounted upon the axle housing and provided with inwardly-extending lugs O, which are in the space between the members I and K adjacent to the rolls L. A pair of these lugs is provided for each roll, being arranged upon opposite sides thereof with sufficient clearance space to permit the movement of the roll into clutching engagement on one side of the cam while holding the roll from such engagement with the other side. The member I is also provided with lugs P, into the path of which the lugs O extend. The arrangement is such that whenever the axle F and the member I secured thereto are rotating, the lugs P engaging the lugs O will compel the member N to rotate also. This is true in whichever direction the member I is revolved, but there is sufficient lost motion or clearance space between the lugs P and O to permit the member N to remain stationary for an instant when the direction of rotation is reversed. Thus, while rotating in a forward direction the members I and N are in one relation, while the reversal of the movement of rotation will effect an adjustment and place the members I and N in another relation. This adjustment shifts the lugs O in relation to the cam faces M, so that the clutch rolls are always free to engage the cam when driven by the member I, but are held from engagement with the opposite side of the cam when the member K is driven ahead of the member I.

By means of the construction as above described, normally the rotation of the axle F will drive equally both of the wheels G and G', and this will continue as long as both wheels are traveling at the same speed. If, however, one wheel travels ahead, due to the turning of the vehicle, this will at once disengage the clutch of the said wheel, permitting it to revolve independently of the axle. The instant, however, that the angular rotation of the axle exceeds that of the wheel the clutch will reëngage, and this is true whether the vehicle is driven forward or backward. Whenever there is a reversal either from forward drive to backward or from backward to forward, the lost motion between the lugs O and P, together with the frictional resistance to the rotation of the member N by its bearing on the axle housing, will permit said member to remain stationary, and thus to adjust its position in relation to the cams and rolls to reverse the engagement of the clutch.

What I claim as my invention is:—

1. The combination with a drive axle and a driven wheel, of a friction clutch therebetween engageable by a rotation of the axle in either direction, a member other than the axle and wheel, and positively driven means mounted upon said member for preventing the engagement of said clutch when said wheel is driven in advance of said axle in the direction in which the latter is rotating.

2. The combination with a drive axle and a driven wheel, of a friction clutch therebetween engageable by a relative rotation of said parts in either direction, a stationary member, and positively driven means upon said stationary member controlled by the direction of rotation of said drive axle for preventing engagement of said clutch when said wheel is driven in the same direction as the axle in advance thereof.

3. The combination with a drive axle and a driven wheel, of a roller clutch therebetween engageable by a relative rotation of said parts in either direction, a member other than the axle and wheel, positively driven means upon said member for preventing engagement of said clutch alternatively in opposite directions and means controlled by the direction of rotation of said axle for adjusting said preventing means to release said clutch when said wheel is rotating in advance in the same direction.

4. The combination with a drive axle and a driven wheel, of a roller clutch therebetween engageable by a relative rotation of said parts in either direction, a member other than the axle and wheel, a positively driven member mounted upon said member rotatably adjustable in relation to one of the members of said clutch, to alternatively prevent engagement thereof in opposite directions and means controlled by the direction of rotation of said axle for shifting said adjustable means.

5. The combination with a drive axle and a driven wheel, of a drum mounted on said wheel, a cam mounted on said axle within said drum, rolls between said cam and drum coöperating therewith to form a roller clutch engageable by a relative rotation of the axle and wheel in opposite directions, a member engaging the rolls of said clutch rotatably adjustable in relation to said cam to alternatively prevent engagement of said clutch in opposite directions, a lost motion driving connection between said cam and member for adjusting the same upon reversal in the direction of movement of said axle, and stationary means for supporting said member engaging the rolls of the clutch.

6. The combination with a drive axle and a driven wheel, of a drum mounted on said wheel, a cam mounted on said axle, rolls in between said cam and drum coöperating to form a roller clutch engageable by a relative movement in either direction, a stationary housing for said axle, a member rotatively mounted on said housing engaging the rolls of said clutch and adjustable to alternatively hold said rolls from engagement by rotations in opposition directions, and a lost-motion drive connection between said cam and member for automatically adjusting the latter upon reversal of the direction of drive.

7. The combination with drive and driven members, of a friction clutch therebetween engageable by a rotation of the drive member in either direction and positively driven means supported independently of said members for preventing the engagement of said clutch when said driven member is driven in advance of said drive member in the direction in which the latter is rotating.

In testimony whereof I affix my signature in presence of two witnesses.

HENRY S. HOPPER.

Witnesses:
JAMES P. BARRY,
H. E. BOWMAN.